(No Model.)
O. TOWER.
HARROW.
No. 455,497. Patented July 7, 1891.
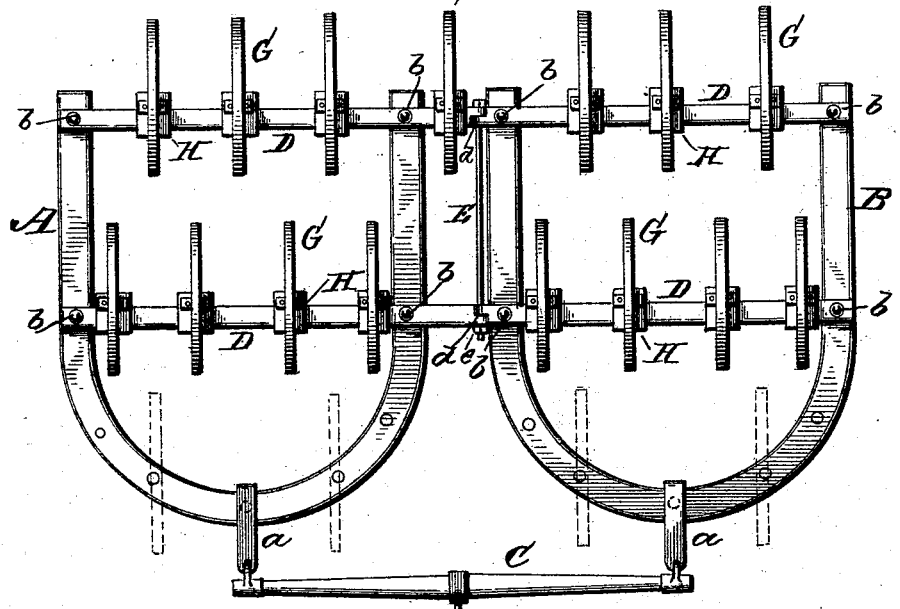
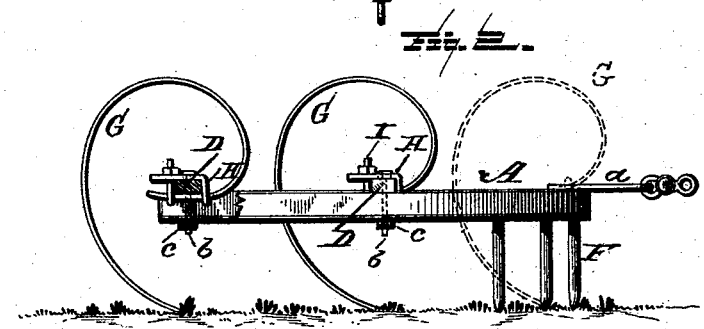
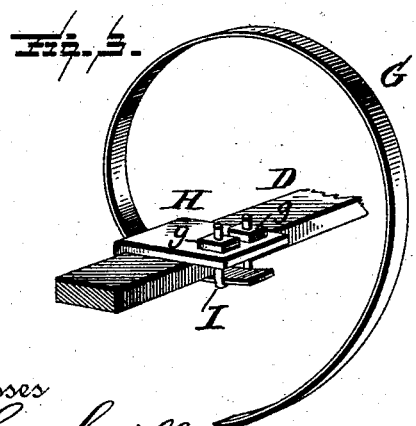
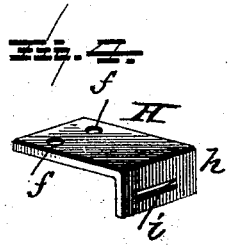
Witnesses
L. C. Hills
R. L. Baldwin
Inventor
Oscar Tower,
per Chas. H. Fowler
Attorney

UNITED STATES PATENT OFFICE.

OSCAR TOWER, OF WILSON, NEW YORK.

HARROW.

SPECIFICATION forming part of Letters Patent No. 455,497, dated July 7, 1891.

Application filed October 9, 1890. Serial No. 367,516. (No model.)

*To all whom it may concern:*

Be it known that I, OSCAR TOWER, a citizen of the United States, residing at Wilson, in the county of Niagara and State of New York, have invented certain new and useful Improvements in Harrows; and I do hereby declare that the following is a full, clear, and exact description of the same, reference being had to the annexed drawings, making a part of this specification, and to the letters of reference marked thereon.

Figure 1 of the drawings represents a top plan view of my improved harrow, showing in dotted lines the position of the front spring-teeth when in use; Fig. 2, a side elevation thereof, partly in section; Fig. 3, a detail view in perspective of a portion of one of the tooth-bars, showing a spring-tooth connected thereto; Fig. 4, a detail view in perspective of one of the clamping-plates for connecting the spring-tooth to the bar.

The present invention has relation to that class of harrows for which a patent was granted to me August 26, 1890, No. 434,962, and is designed as an improvement thereon; and the invention consists in the several details of construction, substantially as shown in the drawings, and hereinafter described and claimed.

In the accompanying drawings, A B represent the two harrow-frames, of segmental or U shape, or of any other desirable form found best adapted to the purpose, and to the front of these frames are short straps $a$ for detachably connecting thereto the draw-bar C in any suitable manner.

To the frames A B are detachably connected the tooth-bars D, by means of bolts $b$ and nuts $c$, so that the bars can be conveniently removed and connected to the under side of the frames when found necessary, the bolts passing through holes in the bars and frames. The bars D at their inner ends have eyes $d$, through which passes a coupling-rod E, and screw-threaded at one end to receive a nut $e$, by which means the two frames are detachably connected together. When spring-teeth are not in use in the front portion of the harrow, they are replaced by the vertical teeth F, as shown more clearly in Fig. 2 of the drawings, the use of either form of teeth being discretionary.

The spring-teeth G, which may be of any desirable form and construction, are connected to the bars D by means of clamping-plates H, which have holes $f$ to receive the ends of clips I, said ends being screw-threaded to receive nuts $g$, and the plate has a flange $h$, disposed at an angle thereto, and having a slot $i$, through which passes the shank of the tooth. In connecting the teeth to the bar the plate is first placed in position thereon and the shank or end of the tooth inserted through the slot in the flange of the clamping-plate and is embraced by the clip, thus firmly holding the tooth in place on the bar and against lateral displacement. The flange $h$ of the clamping-plate H abuts against the edge of the bar D, which prevents it turning either to the right or left, and by turning the nuts $g$ of the clip I the height of the teeth may be adjusted as circumstances require. The clamping-plates may be adjusted laterally on the bars, so that the spring-teeth may be nearer together or farther apart, or a greater number of teeth used; or the teeth may be changed with relation to each other, so that their positions will be different upon the bars. The teeth may be also adjusted by placing the bars upon the under side of the harrow-frames and connecting them thereto by the bolts and nuts hereinbefore described, thereby providing means for securing a shallow or deep tooth in a harrow. The clamping-plates may be removed from the tooth-bars and connected to the under side in place of the upper side, thus securing further provision for the adjustment of the teeth.

Having now fully described my invention, what I claim as new, and desire to secure by Letters Patent, is—

In a harrow, the hinged frames A B, provided with detachable bars D, in combination with suitable teeth and means for adjustably and removably connecting them to the bars, consisting of the clamping-plates H, having the slotted flanges $h$ and the clamps I, substantially as and for the purpose set forth.

In testimony that I claim the above I have hereunto subscribed my name in the presence of two witnesses.

OSCAR TOWER.

Witnesses:
HENRY H. FITCH,
FRANCES A. SANFORD.